US012809102B2

(12) United States Patent
Maeda et al.

(10) Patent No.: US 12,809,102 B2
(45) Date of Patent: Nov. 24, 2026

(54) LIGHT GUIDE PLATE AND IMAGE DISPLAY APPARATUS HAVING THE SAME

(71) Applicant: CANON KABUSHIKI KAISHA, Tokyo (JP)

(72) Inventors: Yuuki Maeda, Tochigi (JP); Yosuke Sakai, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 261 days.

(21) Appl. No.: 18/817,298

(22) Filed: Aug. 28, 2024

(65) Prior Publication Data

US 2025/0116829 A1 Apr. 10, 2025

(30) Foreign Application Priority Data

Oct. 4, 2023 (JP) ................................. 2023-172715

(51) Int. Cl.
*G02B 6/42* (2006.01)

(52) U.S. Cl.
CPC ............. *G02B 6/4214* (2013.01); *G02B 6/42* (2013.01)

(58) Field of Classification Search
CPC ................................ G02B 6/4214; G02B 6/42
See application file for complete search history.

(56) References Cited

U.S. PATENT DOCUMENTS 10,598,938 B1 * 3/2020 Huang ................. G02B 6/4214
10,725,368 B2 7/2020 Maeda
10,866,498 B2 12/2020 Maeda
11,256,004 B2 * 2/2022 Haba ......................... G02B 1/10
2004/0252943 A1 * 12/2004 Schilling .............. G02B 6/4202
385/37
2021/0334506 A1 * 10/2021 Gao ......................... G02B 6/42
2024/0094540 A1 3/2024 Sakai

FOREIGN PATENT DOCUMENTS

JP 2018-165743 A 10/2018
WO 2018/221026 A1 12/2018

OTHER PUBLICATIONS

WO 2006085308, Amitai ; Substrate-Guide Optical Device Utilizing Polarization Beam Splitters; Jun. 26, 2008 see entire document.*
WO 2022145208, Ono; Light Guide and Video Display Devicel Oct. 19, 2023 see entire document.*

* cited by examiner

*Primary Examiner* — Tina Wong
(74) *Attorney, Agent, or Firm* — Carter, DeLuca & Farrell LLP

(57) ABSTRACT

A light guide plate includes a first surface and a second surface that are parallel to each other, and a first separation surface, a second separation surface, and a third separation surface, each configured to separate incident light into reflected light and transmitting light, and each tilted relative to the first surface. Predetermined inequalities are satisfied.

9 Claims, 11 Drawing Sheets

PRIOR ART

LIGHT GUIDE PLATE AND IMAGE DISPLAY APPARATUS HAVING THE SAME

BACKGROUND

Technical Field

One of the aspects of the embodiments relates to a light guide plate configured to guide a display image (light) to a pupil of an observer, and an image display apparatus having the same.

Description of Related Art

An image display apparatus having a light guide plate configured to guide a display image to the observer's pupil has conventionally been known. FIG. 12 is a conceptual diagram of light beams propagating inside the light guide plate of a conventional image display apparatus. Light beams L10, L20, and L30 emitted from pixels of an image display element 110 pass through a projection optical system 1200, enter an entrance portion 1310 at different incident angles, are deflected, and then propagate inside a light guide plate 130 at different total reflection angles α10, α20, and α30 (α10<α20<α30). A part of the light beam incident on an exit portion 132 is deflected and travels toward a pupil SP of an observer, and the other light beams propagate inside the light guide plate 130 by total reflections and enter the exit portion 132. In the conventional image display apparatus, the width of an area (effective area) where the lights L10, L20, and L30 overlap one another at the position of the observer's pupil SP is smaller than the width of the light beam emitted from the exit portion 132, and a large amount of unnecessary light is generated in the effective area, and the light utilization efficiency significantly decreases.

Japanese Patent Laid-Open No. 2018-165743 discloses a configuration configured to set a proper incident angle range with high reflectance and low incidence angle dependency to a plurality of separation surfaces in order to increase the intensity of each light beam incident on the observer's pupil. PCT International Publication WO2018/221026 discloses a configuration configured to set different light reflectances to a plurality of half-transmission layers based on angle dependency so as to reflect light of an angle component incident on the observer's pupil and transmit light of another angle component in order to improve the light guide efficiency.

SUMMARY

A light guide plate according to one aspect of the disclosure includes a first surface and a second surface that are parallel to each other, and a first separation surface, a second separation surface, and a third separation surface, each configured to separate incident light into reflected light and transmitting light, and each tilted relative to the first surface. The following inequalities are satisfied:

$$Rs1_{21} > Rs1_{22} > Rs1_{23}$$

$$Rs1_{31} < Rs1_{32}$$

$$Rs1_{33} < Rs1_{32}$$

where ψ is an angle [°] of each separation surface relative to a normal to the first surface, $\theta_n$ ($\theta_1+5<\theta_2<\theta_3-5$) is an incident angle [θ] of an n-th light ray (where n is a natural number) incident on the first surface, and $Rs1_{mn}$ is a reflectance of an m-th separation surface (where m is 1, 2, or 3) for light with a dominant wavelength incident at an incident angle of $90-\theta_n+\psi$ [°]. An image display apparatus having the above light guide plate also constitutes another aspect of the disclosure.

Further features of various embodiments of the disclosure will become apparent from the following description of embodiments with reference to the attached drawings.

DESCRIPTION OF THE EMBODIMENTS

Figure 1:
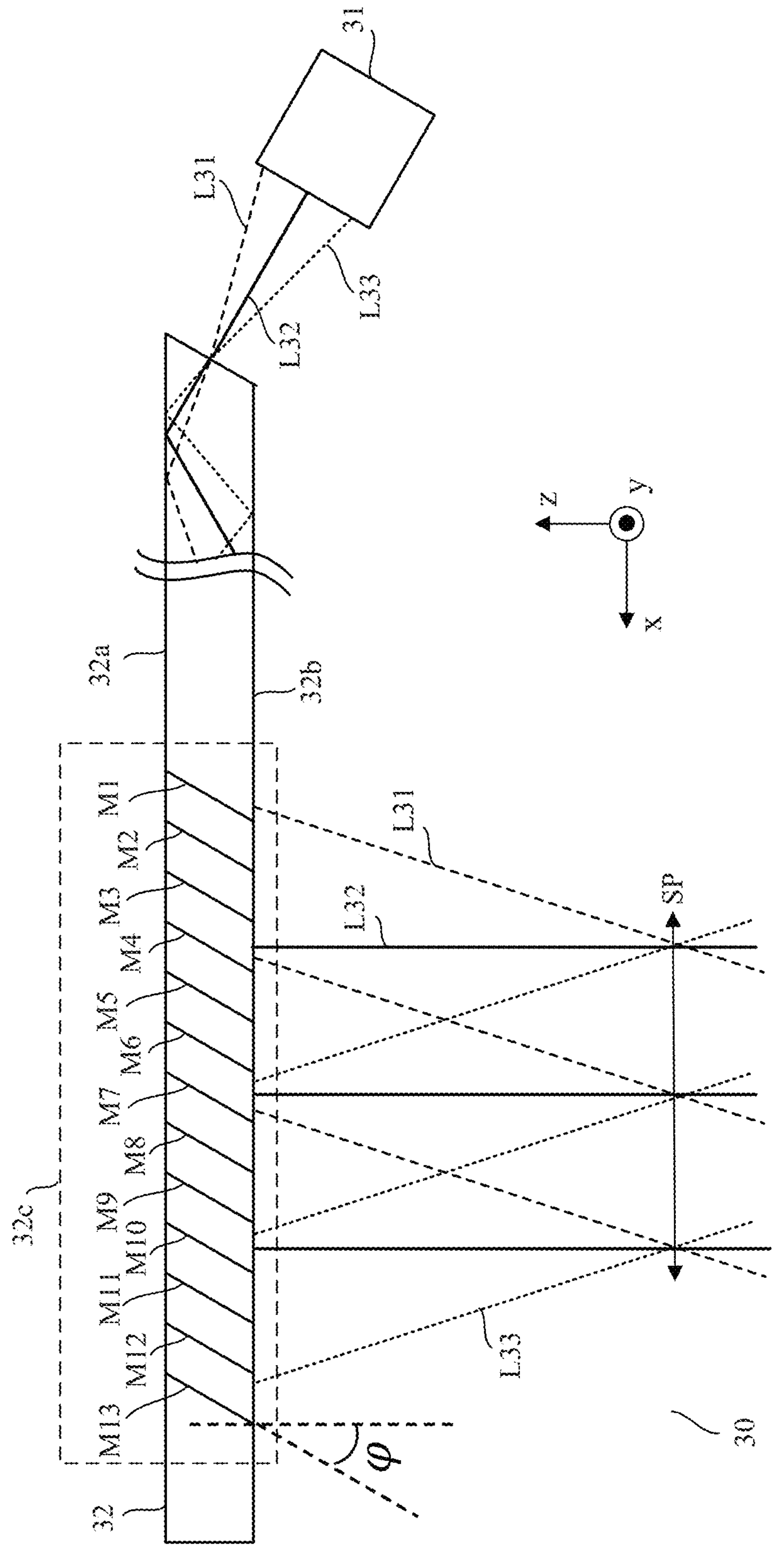
FIG. 1 illustrates the configuration of a light guide plate according to Example 1.

Referring now to the accompanying drawings, a detailed description will be given of embodiments according to the disclosure. Corresponding elements in respective figures will be designated by the same reference numerals, and a duplicate description thereof will be omitted.

Example 1

FIG. 1 illustrates an image display apparatus 30 according to this example. The image display apparatus 30 includes a light source unit 31, and a light guide plate 32. The light guide plate 32 is made of a transparent material such as glass or plastic, and has a first surface 32*a* and a second surface 32*b* that are parallel to each other, and a plurality of separation surfaces 32*c* each configured to separate incident light into reflected light and transmitting light, and each tilted at a predetermined angle relative to the first surface 32*a*. The plurality of separation surfaces 32*c* have the property of reflecting light at a predetermined angle with a predetermined reflectance, and include a plurality of layers including a high refractive index film and a low refractive index film. Generally, film materials such as $TiO_2$, $Ta_2O_5$, and ZnS are used as the high refractive index film, and film materials such as $SiO_2$, $MgF_2$, and $Al_2O_3$ are used as the low refractive index film. In order to improve the transmittance of the external world, an antireflection film is vapor-deposited on each of the first surface 32*a* and the second surface 32*b*.

Figure 2:
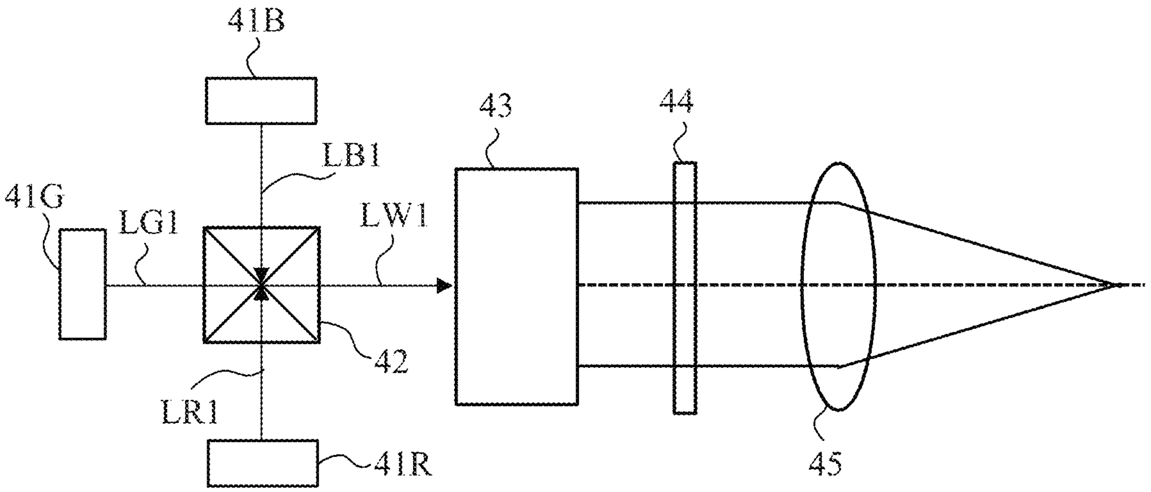
FIG. 2 illustrates the configuration of a light source unit according to Example 1.

FIG. 2 illustrates the light source unit 31. The light source unit 31 includes an RGB laser light source 41, a cross dichroic prism 42, an illumination optical system 43, a liquid crystal panel 44 as an image display element, and a condenser lens 45. The RGB laser light (P-polarized light) emitted from the laser light source 41 is combined by the cross dichroic prism 42 and emitted to the illumination optical system 43. The laser light incident on the illumination optical system 43 uniformly illuminates the liquid crystal panel 44, and the image light (S-polarized light) modulated by the liquid crystal panel 44 is condensed on a predetermined position of the light guide plate 32 via the condenser lens 45. The light (P-polarized light) not modulated by the liquid crystal panel 44 is absorbed by an unillustrated polarizing plate or the like. The P-polarized light and the S-polarized light correspond to the polarization direction defined by the separation surfaces 32*c* of the light guide plate 32. In this example, the dominant wavelengths of the laser light source 41 are 450 nm, 520 nm, and 640 nm. This example illustrates the image display apparatus configured to emit three colors of light, RGB, but it may be configured to emit a single color light using only a G laser light source.

A reflective liquid crystal panel (LCOS) or a digital mirror device in which minute mirrors form pixels may be used as the image display element. The light source unit 11 may include a laser light source and Micro Electro Mechanical Systems (MEMS). An Organic Light Emitting Diode (OLED) or a Micro LED may be used as the light source unit 11.

Figure 3A:
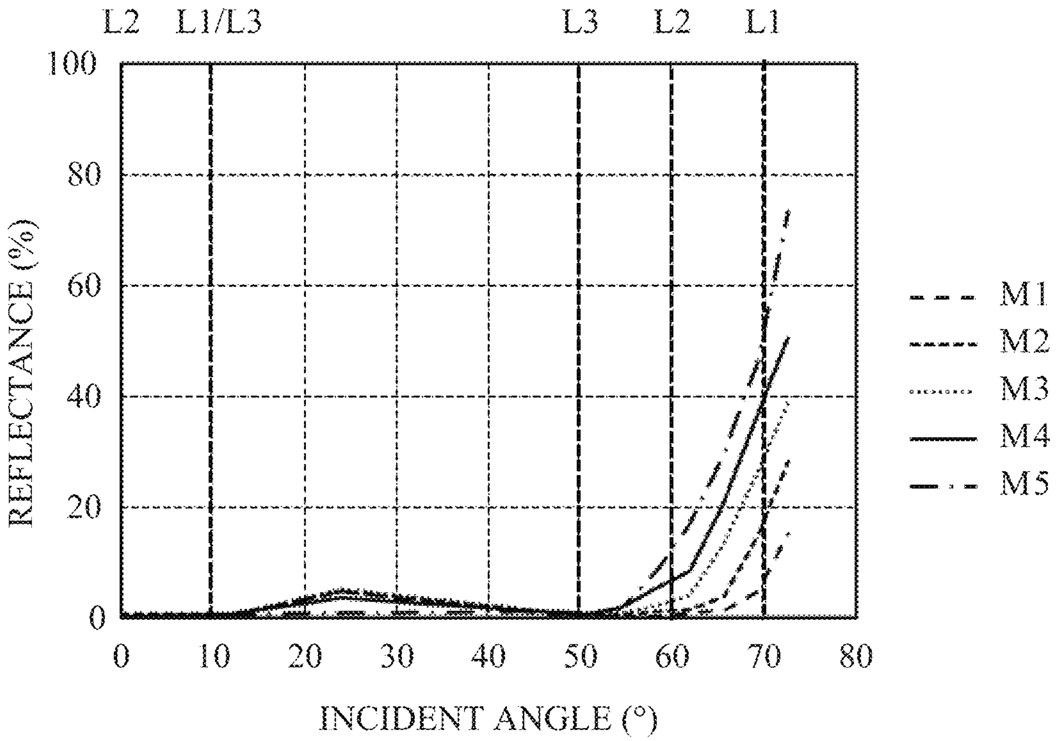
FIGS. 3A to 3C illustrate the reflectance of S-polarized light against an incident angle on a dielectric film in Example 1.
Figure 3B:
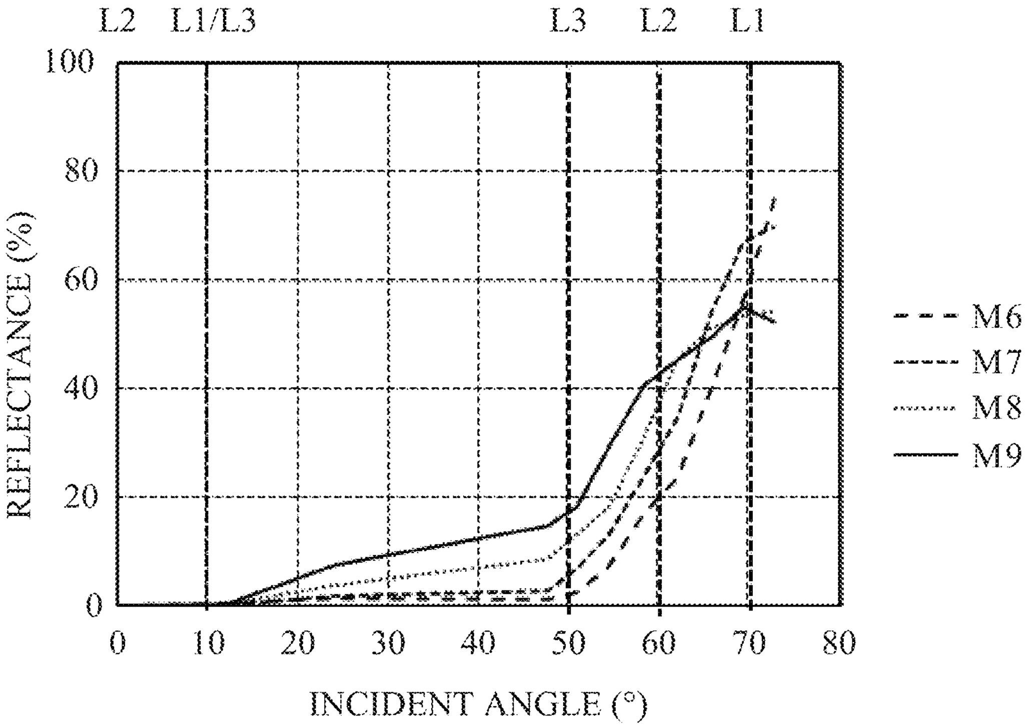
Figure 3C:
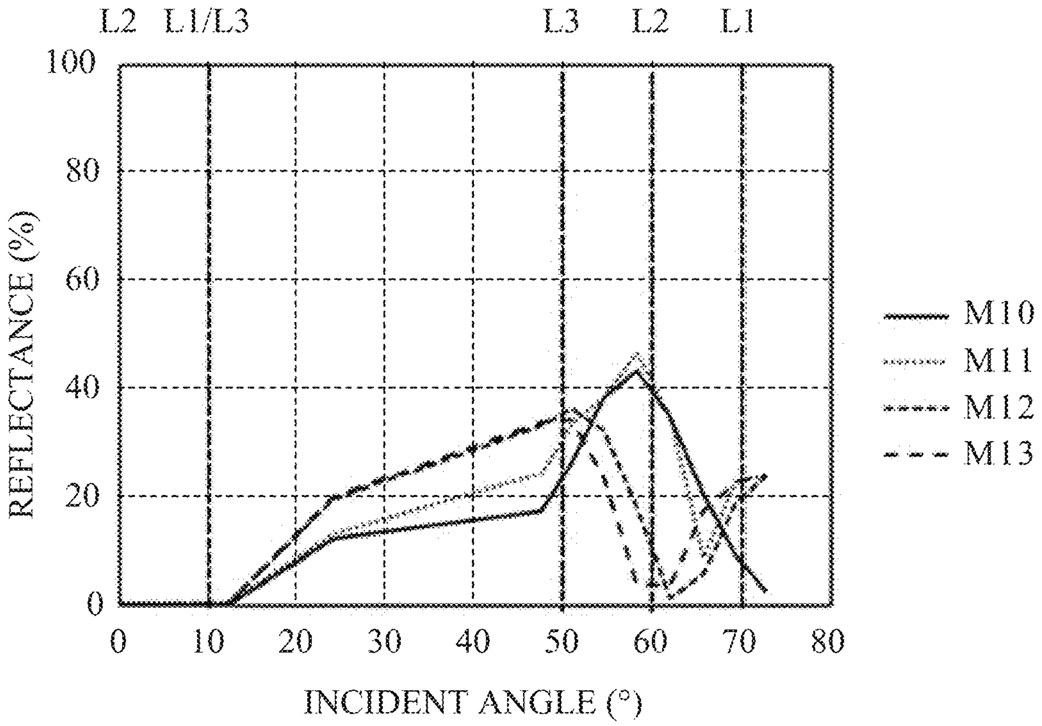

The image light polarized in a predetermined direction (S-polarized light) emitted from the light source unit 31 enters the light guide plate 32, is totally reflected, propagates through the light guide plate 32, is split (or separated) into a plurality of light beams at a plurality of separation surfaces 32*c*, and is guided to the observer's pupil SP. The plurality of separation surfaces 32*c* has first to thirteenth dielectric films M1 to M13. FIGS. 3A to 3C illustrate the reflectance of the S-polarized light against the incident angle of green light with a dominant wavelength of 520 nm for the first to thirteenth dielectric films M1 to M13. The reflectance characteristic of the S-polarized light of red light with a dominant wavelength of 640 nm and blue light with a dominant wavelength of 450 nm are also illustrated.

In this example, the light rays with incident angles $\theta_1$, $\theta_2$, and $\theta_3$ ($\theta_1+5<\theta_2<\theta_3-5$) on the first surface 32*a* will be respectively referred to as a first light ray L31, a second light ray L32, and a third light ray L33. Where y is an angle [°] of each separation surface relative to the normal to the first surface 32*a* (second surface 32*b*), an incident angle $\psi 1_n$ [°] of the n-th light ray (where n is a natural number) from the first surface 32*a* to the separation surface is $90-\theta_n+\psi$. An incident angle $\psi 2_n$ [°] of the n-th light ray from the second surface 32*b* to the separation surface is $90-\theta_n-\psi$. In this example, the angle $\psi$ is 30°, the incident angles $\theta_1$, $\theta_2$, and $\theta_3$ are 50°, 60°, and 70°, respectively, and the incident angles $\psi 1_1$, $\psi 1_2$, $\psi 1_3$, $\psi 2_1$, $\psi 2_2$, and $\psi 2_3$ are 70°, 60°, 50°, 10°, 0°, and −10°, respectively. The second light ray L32 is the center of the light beam propagating within the light guide plate 32.

The first light ray L31 is split into a plurality of light rays by the first to seventh dielectric films M1 to M7 and is guided to the pupil SP. The second light ray L32 transmits through the first to third dielectric films M1 to M3, is split into a plurality of light rays by the fourth to tenth dielectric films M4 to M10, and is guided to the pupil SP. The third light ray L33 transmits through the first to sixth dielectric films M1 to M6, is split into a plurality of light rays by the seventh to thirteenth dielectric films M7 to M13, and is guided to the pupil SP. Thus, the light beam can be condensed on the pupil SP, and high light utilization efficiency can be realized.

Figure 4A:
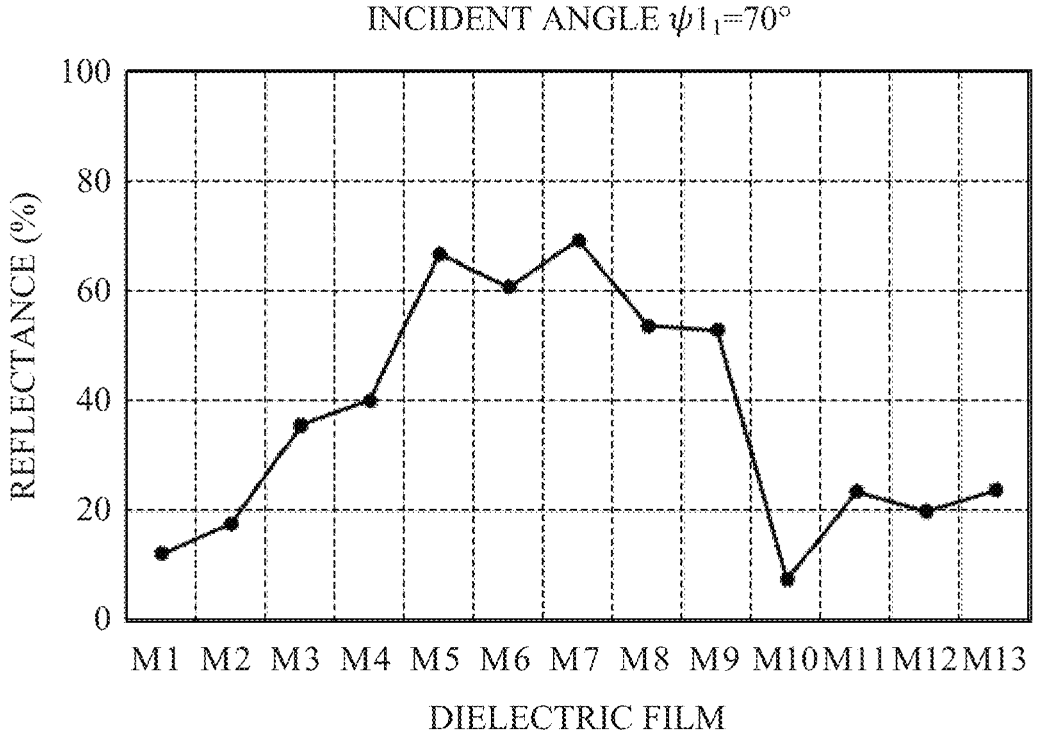
FIGS. 4A to 4C illustrate the reflectance of S-polarized light of each dielectric film in Example 1.
Figure 4B:
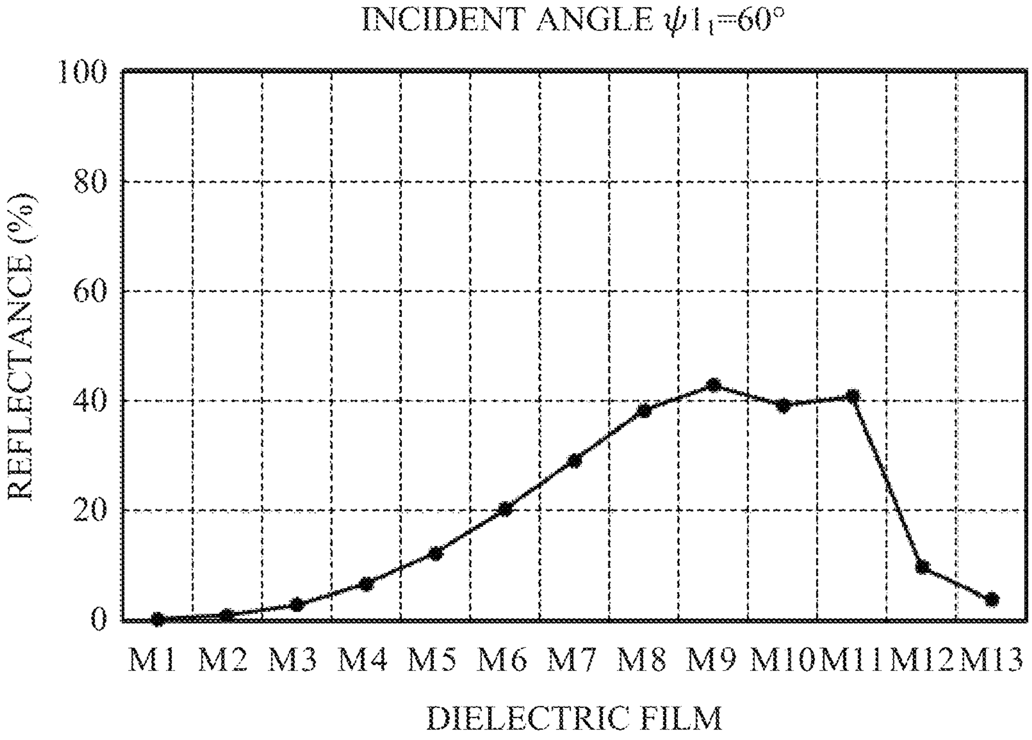
Figure 4C:
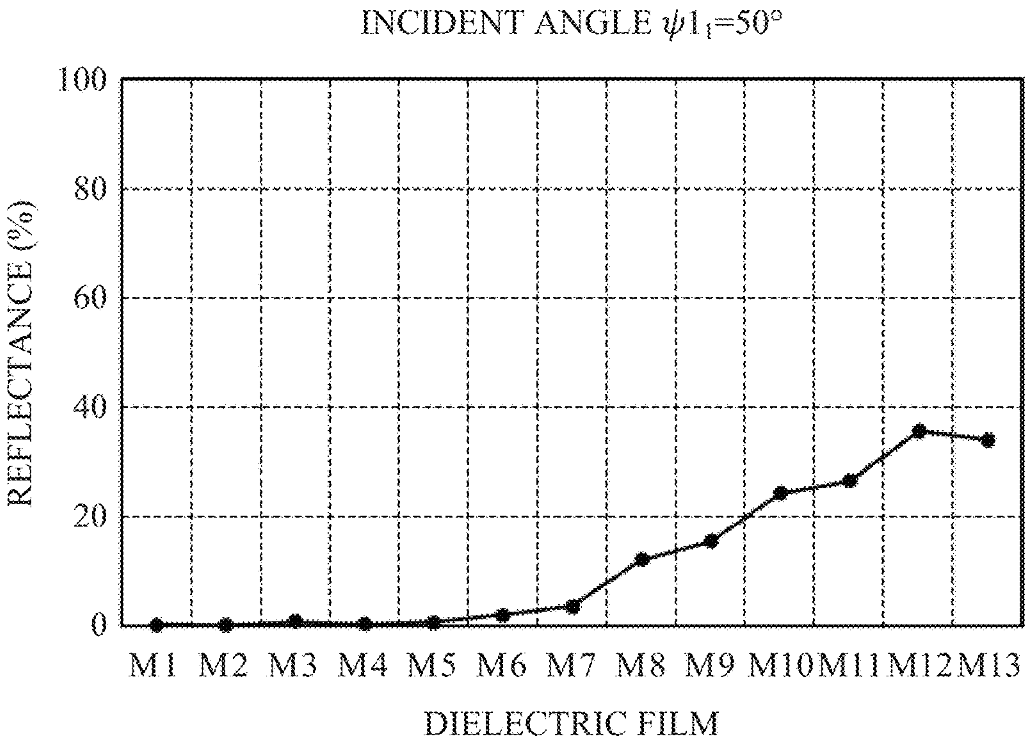

FIG. 4A to 4C illustrate the reflectance of S-polarized light for each dielectric film when the incidence angle $\psi 1_1$ of green light with a dominant wavelength of 520 nm is 70°, 60°, and 50°, respectively. In a case where the incidence angle $\psi 1_1$ is 70°, the reflectance has the characteristic of increasing from the first dielectric film M1 to the seventh dielectric film M7 and decreasing from the eighth dielectric film M8 to the thirteenth dielectric film M13. In a case where the incident angle $\psi 1_1$ is 60°, the reflectance is low in the first to third dielectric films M1 to M3, increases from the fourth dielectric film M4 to the tenth dielectric film M10, and decreases from the eleventh dielectric film M11 to the thirteenth dielectric film M13. In a case where the incident angle $\psi 1_1$ is 50°, the reflectance is low in the first to sixth dielectric films M1 to M6, and increases from the seventh dielectric film M7 to the thirteenth dielectric film M13. By making the reflectance of the dielectric film that condenses the light beam on the pupil SP higher along the x direction, the light intensity distribution in the pupil SP can be made uniform.

Generally, the reflectance is higher on the high incident angle side, but reducing the reflectance on the high incident angle side of the dielectric film on the (far) depth side in the x direction (especially the tenth to thirteenth dielectric films M10 to M13) can increase the transmittance while reducing the angular unevenness of the transmittance of the light from the outside.

Figure 5A:
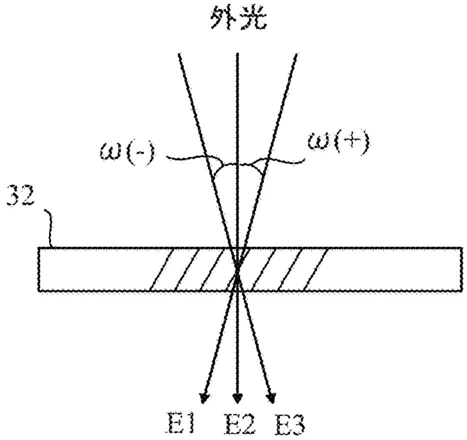
FIGS. 5A and 5B illustrate the transmittance of S-polarized light of the external world in Example 1.
Figure 5B:
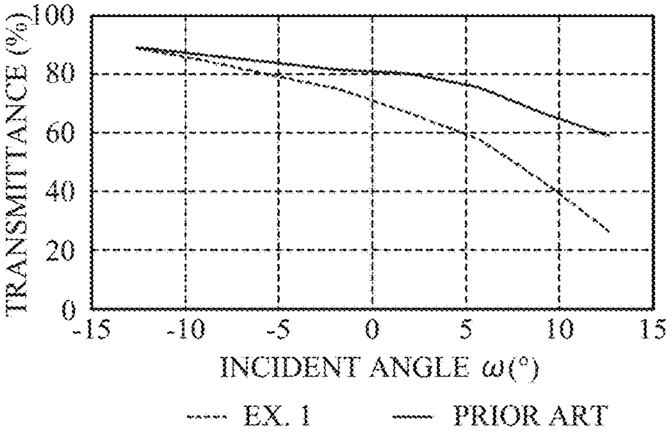

FIGS. 5A and 5B illustrate a relationship between the incident angle of external light incident on the light guide plate 32 for light with a dominant wavelength of 520 nm of green light and the average transmittance of S-polarized light of the first to thirteenth dielectric films M1 to 13. FIG. 5A is a schematic diagram defining the incident angle of external light on the light guide plate 32, where ω(+) represents a positive angle and ω(−) represents a negative angle. FIG. 5B illustrates the average transmittance against incident angle between this example and prior art (in which the reflectance on the high incident angle side does not decrease).

External light is generally unpolarized, so in order to reduce the reflectance of P-polarized light, the first to thirteenth dielectric films M1 to 13 are configured to satisfy the following Brewster condition in a case where the incident angles $\psi 1_1$ and $\psi 1_3$ are 70° and 50°, respectively.

$$\kappa = \sin^{-1}\sqrt{\frac{n_H^2 n_L^2}{n_G^2\left(n_H^2 + n_L^2\right)}}$$

Figure 6A:
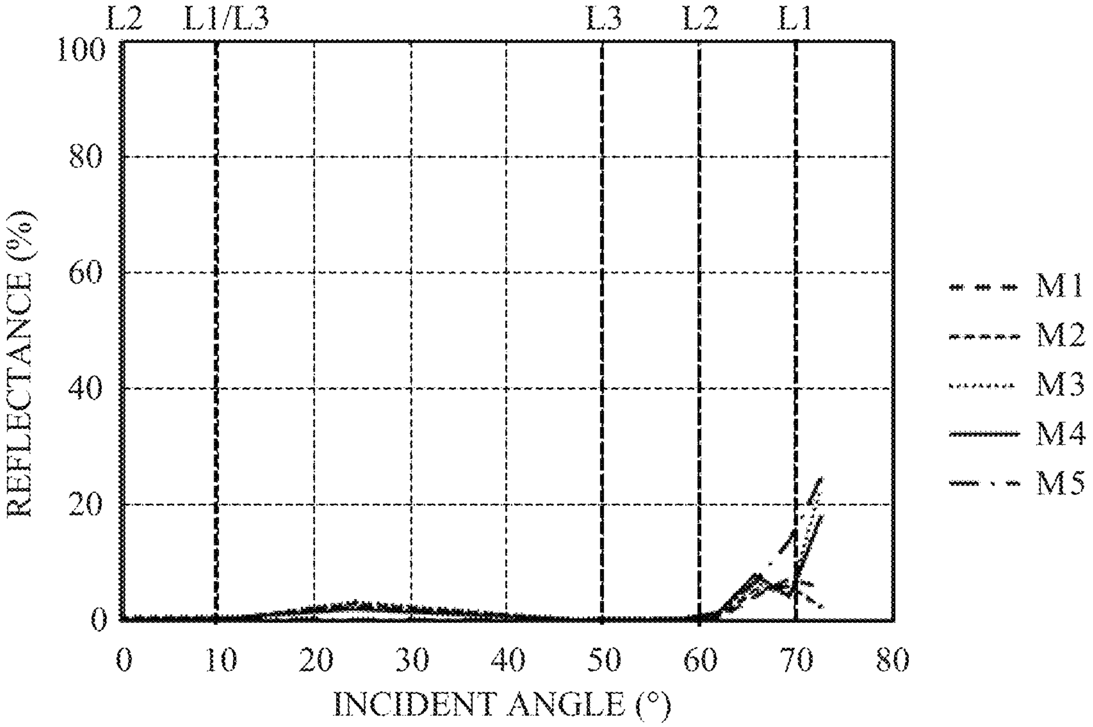
FIGS. 6A to 6C illustrate the reflectance of P-polarized light against the incident angle of the dielectric film in Example 1.
Figure 6B:
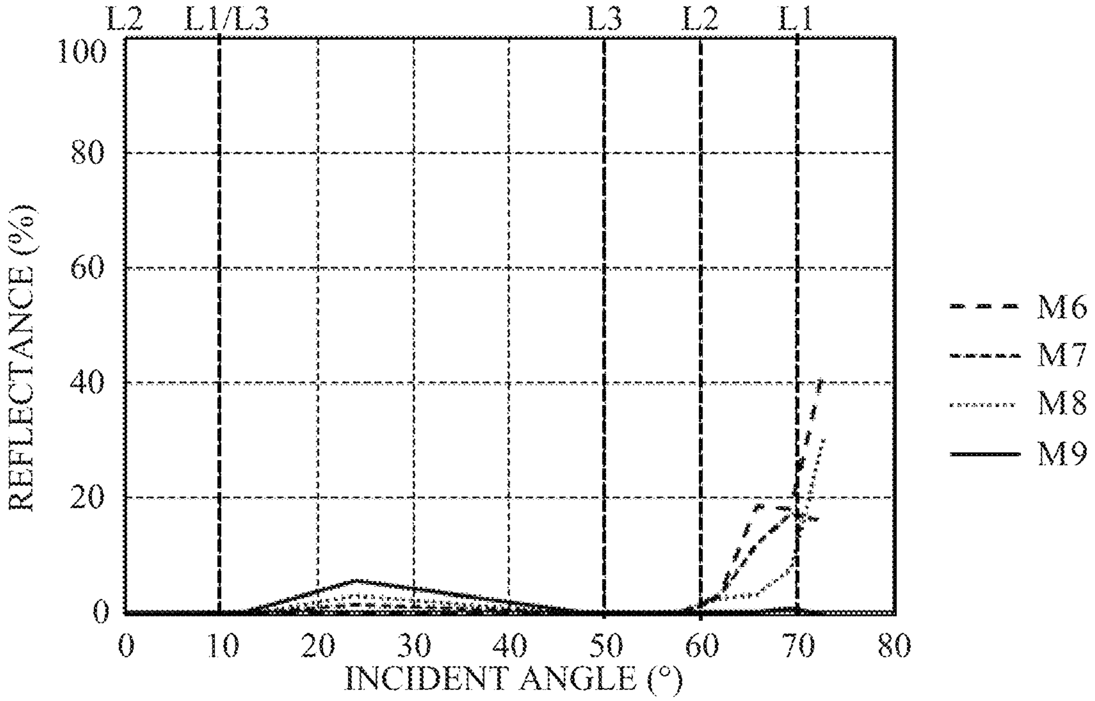
Figure 6C:
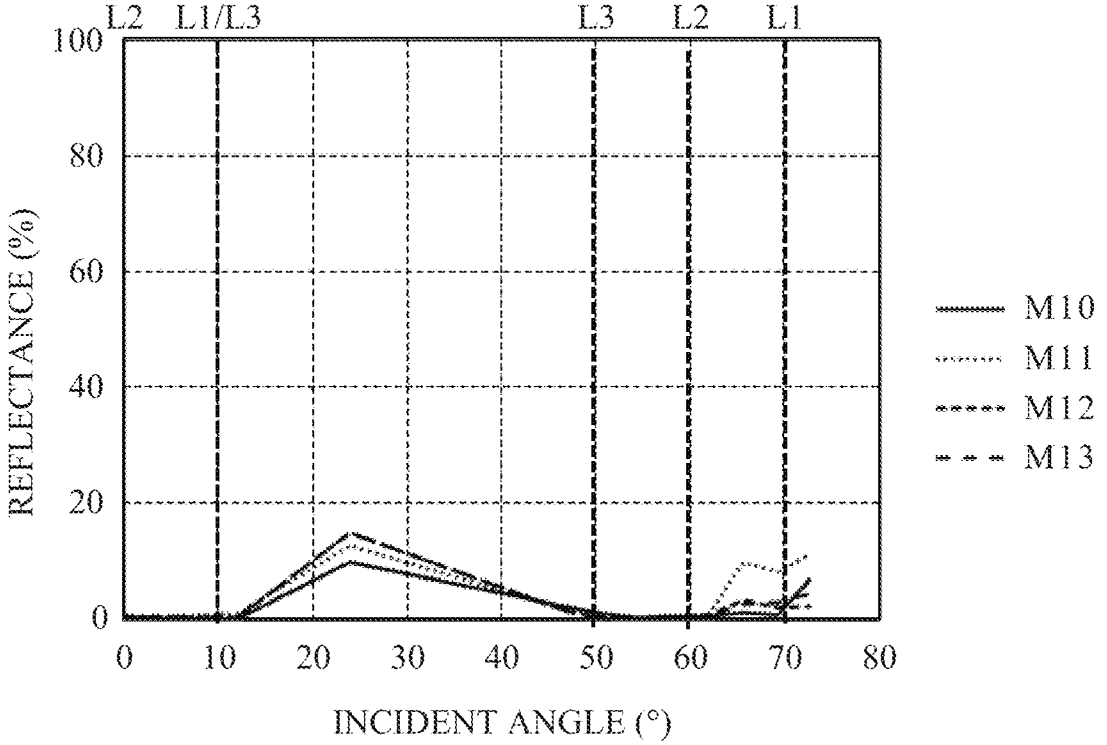

Here, $n_H$ is a refractive index of the high refractive index film constituting the dielectric film for light of the dominant wavelength. $n_L$ is a refractive index of the low refractive index film constituting the dielectric film for light of the dominant wavelength. $n_G$ is a refractive index of the light guide plate 32 for light of the dominant wavelength. The refractive indices $n_H$, $n_L$, and $n_G$ for light of dominant wavelength 520 nm are 2.402, 1.457, and 1.518, respectively, and the Brewster condition K is 55.1°. FIGS. 6A to 6C illustrate the reflectance of P-polarized light against the incident angle of light of dominant wavelength 520 nm of green light for the first to thirteenth dielectric films M1 to M13. The reflectance is nearly 0% against the incident angles of 50° to 60°, and can be reduced for incident angles of 50° to 70°.

In this example, an angle of field H in the x direction is 38.6°, and an upper limit value $\psi 1_H$ and lower limit value $\psi 1_L$ of the angular distribution of the light beams propagating within the light guide plate 32 and entering the plurality of separation surfaces 32*c* are obtained by the following equations:

$$\psi 1_H = \psi 1_2 + SN(H/2)$$

$$\psi 1_L = \psi 1_2 - SN(H/2)$$

$$SN(x) = \sin^{-1}[(\sin x)/n_G]$$

Here, SN(x) has a unit of degree (°). In this example, the upper limit value $\psi 1_H$ and the lower limit value $\psi 1_L$ are 72.5° and 47.5°, respectively. In this example, the incident angles $\psi 1_1$ and $\psi 1_3$ are defined as follows using the angle of field in the x direction:

$$\psi 1_1 = \psi 1_2 + SN(H/2) \times 0.8$$

$$\psi 1_3 = \psi 1_2 - SN(H/2) \times 0.8$$

Figure 7:
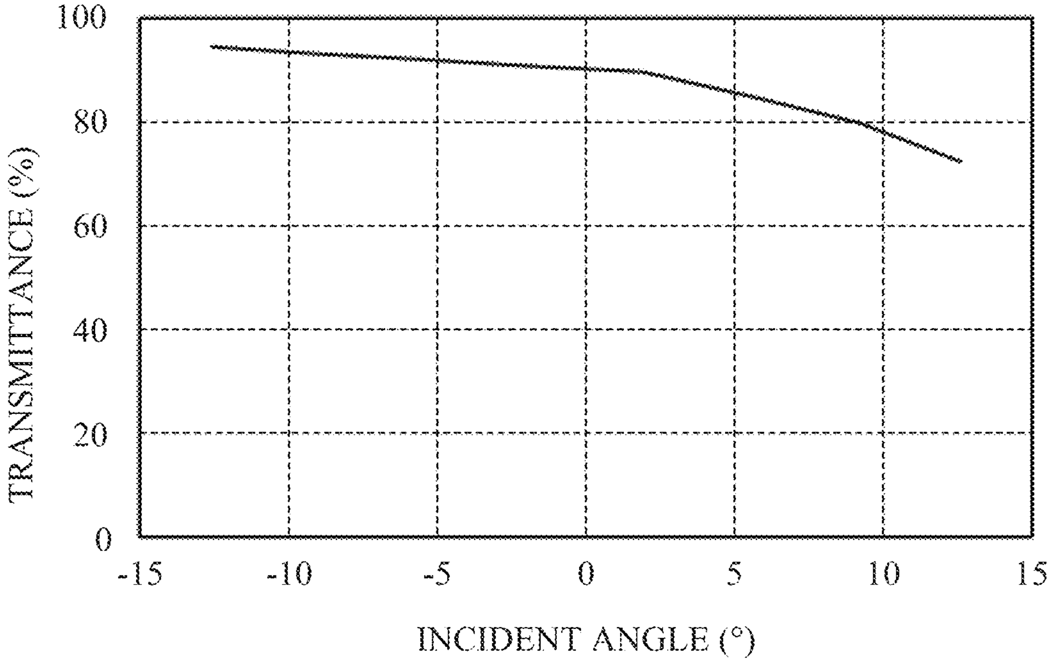
FIG. 7 illustrates the transmittance of unpolarized light (nonpolarized light) of the external world in Example 1.

FIG. 7 illustrates a relationship between an incident angle of light with a dominant wavelength of 520 nm of green light from the external world incident on the light guide plate 32 and an average transmittance of unpolarized light of the first to thirteenth dielectric films M1 to M13. As illustrated in FIG. 7, the transmittance of external light can be improved while light amount unevenness is reduced with high light utilization efficiency.

Next follows conditions that this example may satisfy.

Figure 8:
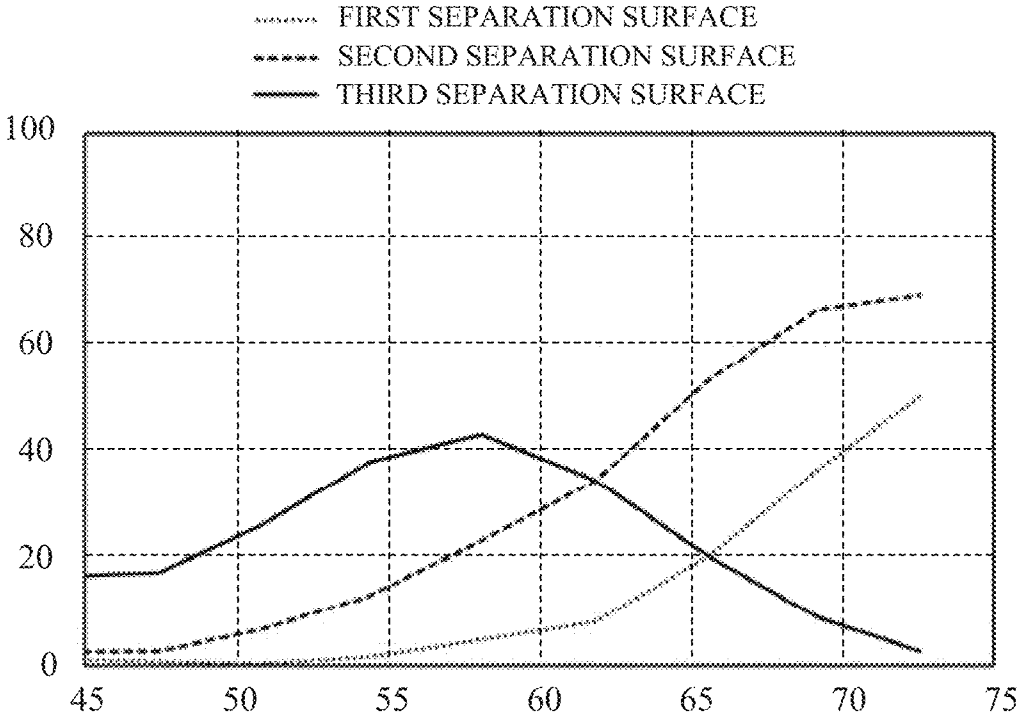
FIG. 8 illustrates the reflectance of S-polarized light of first to third separation surfaces in Example 1.

The first dielectric film M1 will be referred to as a first separation surface, the seventh dielectric film M7 will be referred to as a second separation surface, and the tenth dielectric film M10 will be referred to as a third separation surface. In a case where an eyebox size is d (mm), a surface that passes through or is closest to the normal from the center of the eyebox is the second separation surface. A surface that passes through or is closest to the normal from a position d/2 in the negative x direction from the center of the eyebox is the first separation surface, and a surface that passes through or is closest to the normal from a position d/2 in the positive x direction from the center of the eyebox is the third separation surface. FIG. 8 illustrates the reflectance of S-polarized light against the incident angle of light with the dominant wavelength for the first to third separation surfaces. The first to third separation surfaces satisfy the following inequalities (1) to (3):

$$Rs1_{21} > Rs1_{22} > Rs1_{23} \quad (1)$$

$$Rs1_{31} < Rs1_{32} \quad (2)$$

$$Rs1_{33} < Rs1_{32} \quad (3)$$

where $Rs1_{mn}$ is the reflectance of S-polarized light of the m-th (m: 1, 2, 3) separation surface for the n-th light ray (at the incident angle $\psi 1_n$).

Deviations from inequality (1) cause significant luminance unevenness. Deviations from inequalities (2) and (3) increase the transmittance of external light.

Inequalities (1) to (3) may be replaced with inequalities (1a) to (3a) below:

$$Rs1_{21} > 1.2 \times Rs1_{22} > 1.2 \times Rs1_{23} \quad (1a)$$

$$1.2 \times Rs1_{31} < Rs1_{32} \quad (2a)$$

$$1.2 \times Rs1_{33} < Rs1_{32} \quad (3a)$$

Inequalities (1) to (3) may be replaced with inequalities (1b) to (3b) below:

$$Rs1_{21} > 1.4 \times Rs1_{22} > 1.4 \times Rs1_{23} \quad (1b)$$

$$1.4 \times Rs1_{31} < Rs1_{32} \quad (2b)$$

$$1.4 \times Rs1_{33} < Rs1_{32} \quad (3b)$$

The reflectance of the first separation surface may satisfy the following inequality (4):

$$Rs1_{11} > Rs1_{12} > Rs1_{13} \quad (4)$$

In a case where inequality (4) is not satisfied, luminance unevenness significantly occurs.

Inequality (4) may be replaced with inequality (4a) below:

$$Rs1_{11} > 1.2 \times Rs1_{12} > 1.2 \times Rs1_{13} \quad (4a)$$

Inequality (4) may be replaced with inequality (4b) below:

$$Rs1_{11} > 1.4 \times Rs1_{12} > 1.4 \times Rs1_{13} \quad (4b)$$

The following inequality (5) may be satisfied:

$$Rs2_{m3} < 0.050 \quad (5)$$

where $Rs2_{mn}$ is a reflectance of S-polarized light of the m-th separation surface for the n-th light ray (at the incident angle $\psi 2_n$).

In a case where inequality (5) is not satisfied, an unnecessary light amount in the light guide plate 22 increases, ghost light occurs, and the light utilization efficiency also decreases.

Inequality (5) may be replaced with inequality (5a) below:

$$Rs2_{m3} < 0.035 \quad (5a)$$

Inequality (5) may be replaced with inequality (5b) below:

$$Rs2_{m3} < 0.020 \quad (5b)$$

The following inequality (6) may be satisfied:

$$Rs1_{22} > 2 \times Rp1_{22} \quad (6)$$

where $Rp1_{mn}$ is a reflectance of P-polarized light of the m-th separation surface for the n-th light ray (at the incident angle $\psi 1_n$).

In a case where inequality (6) is not satisfied, the transmittance of external light passing through the light guide plate 22 significantly decreases.

Inequality (6) may be replaced with inequality (6a) below:

$$Rs1_{22} > 3 \times Rp1_{22} \quad (6a)$$

Inequality (6) may be replaced with inequality (6b) below:

$$Rs1_{22} > 5 \times Rp1_{22} \quad (6b)$$

The angle $\psi$ [°] of the plurality of separation surfaces 32*c* for the normal to the first surface 32*a* (second surface 32*b*) may satisfy the following inequality (7).

$$5° < \psi < 45° \quad (7)$$

In a case where the angle deviates from the upper or lower limit of inequality (7), the incident angle $\psi 1_n$ becomes small, making it difficult to satisfy the Brewster condition, and the transmittance of external light drops significantly.

Inequality (7) may be replaced with inequality (7a) below:

$$10° < \psi < 42° \quad (7a)$$

Inequality (7) may be replaced with inequality (7b) below:

$$20° < \psi < 39° \quad (7b)$$

The light in the external world is generally unpolarized, and in order to reduce the reflectance of P-polarized light, the second separation surface may satisfy the following inequality (8):

$$\psi 1_3 < \sin^{-1}\sqrt{\frac{n_H^2 n_L^2}{n_G^2(n_H^2 + n_L^2)}} < \psi 1_1 \quad (8)$$

$n_H$ is a refractive index of the first film, which has a higher refractive index for light with the dominant wavelength among films with the two largest total thicknesses on the second separation surface. $n_L$ is a refractive index of the second film, which has a lower refractive index for the light with the dominant wavelength among the films with the two largest total thicknesses on the second separation surface.

In a case where the value becomes higher than the upper limit or lower than the lower limit of inequality (8), the Brewster condition cannot be satisfied within the angular range of the effective light beam, and the transmittance of external light significantly decreases.

Inequality (8) may be replaced with inequality (8a) below:

$$\psi 1_3 + \frac{H}{40} < \sin^{-1}\sqrt{\frac{n_H^2 n_L^2}{n_G^2(n_H^2 + n_L^2)}} < \psi 1_1 - \frac{H}{20} \quad (8a)$$

Inequality (8) may be replaced with inequality (8b) below:

$$\psi 1_3 + \frac{H}{20} < \sin^{-1}\sqrt{\frac{n_H^2 n_L^2}{n_G^2(n_H^2 + n_L^2)}} < \psi 1_1 - \frac{H}{5} \quad (8b)$$

The following inequality (8c) can be derived from inequality (8):

$$90 - \theta_3 - \varphi < \sin^{-1}\sqrt{\frac{n_H^2 n_L^2}{n_G^2(n_H^2 + n_L^2)}} < 90 - \theta_1 - \varphi \quad (8c)$$

The left side of inequality (8) corresponds to the left side of inequality (8c), and the right side of inequality (8) corresponds to the right side of inequality (8c).

The dielectric film in this example has a film property that combines the properties of a polarization separation film and a half-mirror film, so in order to separate polarization at an incident angle $\psi 1_2$ of 60°, a refractive index difference between the high refractive index film and the low refractive index film may be large, and the refractive index of the substrate may be low. More specifically, the following inequalities (9) and (10) may be satisfied:

$$n_H - n_L \geq 0.6 \quad (9)$$

$$n_G \leq 1.7 \quad (10)$$

In a case where the value becomes lower than the lower limit of inequality (9) or the value becomes higher than the upper limit of inequality (10), the Brewster condition cannot be satisfied and the transmittance of external light significantly decreases.

Inequalities (9) and (10) may be replaced with inequalities (9a) and (10a) below:

$$nH - nL \geq 0.7 \quad (9a)$$

$$nG \leq 1.65 \quad (10b)$$

Inequalities (9) and (10) may be replaced with inequalities (9b) and (10b) below:

$$nH - nL \geq 0.8 \quad (9b)$$

$$nG \leq 1.60 \quad (10b)$$

In order to design the dielectric film, the following inequality (11) may be satisfied:

$$0.00 < W/R < 0.03 \quad (11)$$

where R [nm] is a central wavelength of at least one spectrum of the light beam emitted from the light source, and W [nm] is a half-width of the spectrum.

In this example, the central wavelength R is 450 nm, 520 nm, and 640 nm, which are the dominant wavelengths of the laser light source 41. In a case where the value becomes higher than the upper limit of inequality (11), a predetermined reflectance must be achieved over a wide wavelength range, the film design becomes extremely difficult, the light utilization efficiency lowers, and the luminance becomes uneven.

Inequality (11) may be replaced with inequality (11a) below:

$$0.00 < W/R < 0.02 \quad (11a)$$

Inequality (11) may be replaced with inequality (11b) below:

$$0.000 < W/R < 0.015 \quad (11b)$$

Table 1 illustrates the film configurations of the first to third separation surfaces.

TABLE 1

(unit: nm)

| FILM NO. | MATERIAL | FIRST SEPARATION SURFACE M4 | SECOND SEPARATION SURFACE M7 | THIRD SEPARATION SURFACE M10 |
|---|---|---|---|---|
| 1 | $SIO_2$ | 41.6 | 13.9 | 26.6 |
| 2 | $TIO_2$ | 10.3 | 11.8 | 10.0 |
| 3 | $SIO_2$ | 87.5 | 84.1 | 101.1 |
| 4 | $TIO_2$ | 26.1 | 27.3 | 18.0 |
| 5 | $SIO_2$ | 33.7 | 40.6 | 80.5 |
| 6 | $TIO_2$ | 173.3 | 65.6 | 19.5 |
| 7 | $SIO_2$ | 10.0 | 12.2 | 80.4 |
| 8 | $TIO_2$ | 70.0 | 58.2 | 25.0 |
| 9 | $SIO_2$ | 19.2 | 23.6 | 65.3 |
| 10 | $TIO_2$ | 46.3 | 40.7 | 40.8 |
| 11 | $SIO_2$ | 60.6 | 10.1 | 28.5 |
| 12 | $TIO_2$ | 21.7 | 34.8 | 54.7 |
| 13 | $SIO_2$ | 115.4 | 10.0 | 17.9 |
| 14 | $TIO_2$ | 10.0 | 52.3 | 49.4 |
| 15 | $SIO_2$ | 62.5 | 10.3 | 10.1 |
| 16 | $TIO_2$ | 11.4 | 211.9 | 181.7 |
| 17 | $SIO_2$ | 62.5 | 11.4 | 11.8 |
| 18 | $TIO_2$ | 29.1 | 170.2 | 246.6 |
| 19 | $SIO_2$ | 31.9 | 11.8 | 10.0 |

TABLE 1-continued (unit: nm)

| FILM NO. | MATERIAL | FIRST SEPARATION SURFACE M4 | SECOND SEPARATION SURFACE M7 | THIRD SEPARATION SURFACE M10 |
|---|---|---|---|---|
| 20 | $TIO_2$ | 147.5 | 163.6 | 60.3 |
| 21 | $SIO_2$ | 10.5 | 35.4 | 23.6 |
| 22 | $TIO_2$ | 10.0 | 22.1 | 47.8 |
| 23 | $SIO_2$ | 24.3 | 187.8 | 67.4 |
| 24 | $TIO_2$ | 33.9 | 10.1 | 30.6 |
| 25 | $SIO_2$ | 39.3 | 35.2 | 30.5 |
| 26 | $TIO_2$ | 10.0 | 137.5 | 143.4 |
| 27 | $SIO_2$ | 10.7 | 45.9 | 72.5 |
| 28 | $TIO_2$ | 141.4 | 29.6 | 11.4 |
| 29 | $SIO_2$ | 62.7 | 81.0 | 111.0 |
| 30 | $TIO_2$ | 14.1 | 23.5 | 14.6 |
| 31 | $SIO_2$ | 139.1 | 82.6 | 117.6 |
| 32 | $TIO_2$ | 13.8 | 25.7 | 13.5 |
| 33 | $SIO_2$ | 56.3 | 47.2 | 57.5 |
| 34 | $TIO_2$ | 46.3 | 136.3 | 120.9 |
| 35 | $SIO_2$ | 10.0 | 41.4 | 63.1 |
| 36 | $TIO_2$ | 80.4 | 16.3 | 10.0 |
| 37 | $SIO_2$ | 48.0 | | |
| 38 | $TIO_2$ | 18.4 | | |
| 39 | $SIO_2$ | 10.1 | | |
| TOTAL | SUM | 1850 | 2022 | 2073 |
| | $SIO_2$ | 936 | 784 | 975 |
| | $TIO_2$ | 914 | 1237 | 1098 |

The following inequalities (12) and (13) may be satisfied:

$$M_H > 400 \quad (12)$$

$$M_L > 300 \quad (13)$$

where $M_H$ [nm] is a total film thickness of the high refractive index film of the second separation film (seventh dielectric film M7), and $M_L$ [nm] is a total film thickness of the low refractive index film of the second separation film.

The second separation film has a film property that combines the properties of a polarization separation film and a half-mirror film, and requires about twice the number of film layers of a general film, so in a case where the values become lower than the lower limits of inequalities (12) and (13), it becomes difficult to achieve the desired performance.

Inequalities (12) and (13) may be replaced with inequalities (12a) and (13a) below:

$$M_H > 500 \quad (12a)$$

$$M_L > 400 \quad (13a)$$

Inequalities (12) and (13) may be replaced with inequalities (12b) and (13b) below:

$$M_H > 600 \quad (12b)$$

$$M_L > 500 \quad (13b)$$

The number of layers of the second separation film may be 20 or more. In a case where the number of layers is small, it becomes difficult to achieve the desired performance. The number of layers of the second separation film may be 25 or more, or 30 or more.

Figure 9:
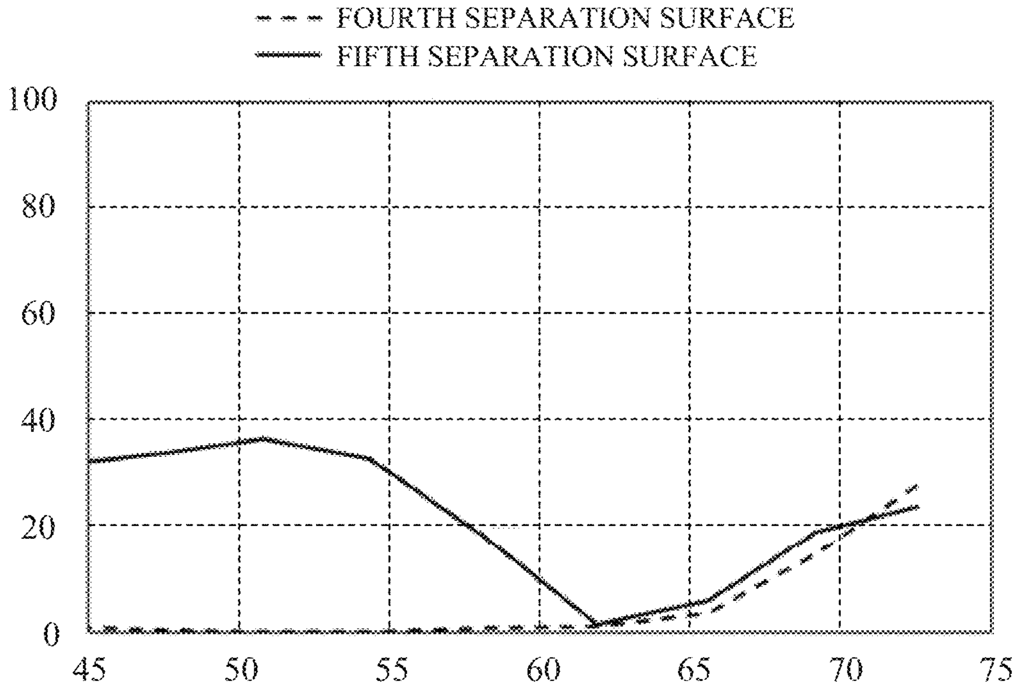
FIG. 9 illustrates the reflectance of S-polarized light of fourth and fifth separation surfaces in Example 1.

The second dielectric film M2 will be referred to as a fourth separation surface, and the twelfth dielectric film M12 will be referred to as a fifth separation surface. FIG. 9 illustrates the reflectance of S-polarized light against the incident angle of light with the dominant wavelength of the fourth and fifth separation surfaces. The fourth separation surface may satisfy the following inequalities (14) to (16):

$$Rs1_{42} < 0.05 \quad (14)$$

$$Rs1_{43} < 0.05 \quad (15)$$

$$Rs1_{42} < Rs1_{41} \quad (16)$$

Since the light rays with incidence angles $\psi1_2$ and $\psi1_3$ of 60° and 50°, respectively, are partially reflected on the fourth separation surface, the light utilization efficiency decreases and ghost light occurs.

Inequalities (14) to (16) may be replaced with inequalities (14a) to (16a) below:

$$Rs1_{42} < 0.03 \quad (14a)$$

$$Rs1_{43} < 0.04 \quad (15a)$$

$$Rs1_{42} < Rs1_{41} \quad (16a)$$

Inequalities (14) to (16) may be replaced with inequalities (14b) to (16b) below:

$$Rs1_{42} < 0.02 \quad (14b)$$

$$Rs1_{43} < 0.03 \quad (15b)$$

$$Rs1_{42} < Rs1_{41} \quad (16b)$$

The fifth separation surface may satisfy the following inequality (17).

$$Rs1_{52} < Rs1_{53} \quad (17)$$

In a case where inequality (17) is not satisfied, the transmittance of external light decreases.

Inequality (17) may be replaced with inequality (17a) below:

$$1.2 \times Rs1_{52} < Rs1_{53} \quad (17a)$$

Inequality (17) may be replaced with inequality (17b) below:

$$1.4 \times Rs1_{52} < Rs1_{53} \quad (17b)$$

In using a three-color (RGB) light source, each inequality may be satisfied at a peak wavelength (dominant wavelength) of each of the red, green, and blue bands.

Example 2

Figure 10:
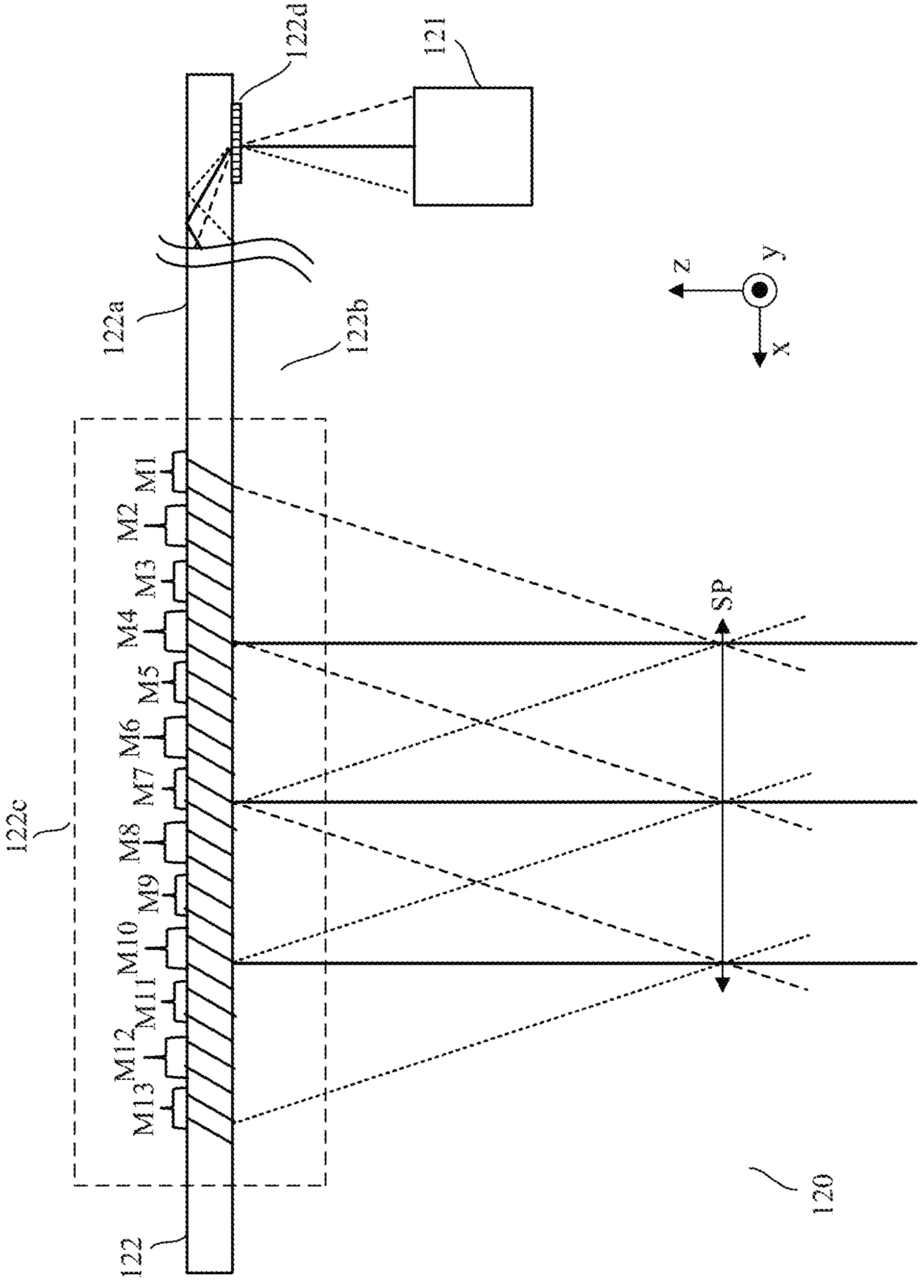
FIG. 10 illustrates the configuration of a light guide plate according to Example 2.

FIG. 10 illustrates the configuration of an image display apparatus 120 according to this example. The image display apparatus 120 includes a light source unit 121, and a light guide plate 122. The light guide plate 122 has a first surface 122*a* and a second surface 122*b* that are parallel to each other, a plurality of separation surfaces 122*c* each tilted at a predetermined angle relative to the first surface 122*a*, and a deflector 122*d*.

The plurality of separation surfaces 122*c* have the first to thirteenth dielectric films M1 to M13 deposited every two separation surfaces similarly to Example 1. This configuration can increase the number of separation surfaces with the same number of dielectric films, and reduce the size of the light guide plate 122. The deflector 122*d* includes a diffraction element, a metasurface, a holographic element, or the like, and deflects a light beam from the light source unit 121 to propagate it through the light guide plate 122.

In this example, the same dielectric film is disposed every two separation surfaces, but the same dielectric film may be disposed every three separation surfaces.

Example 3

Figure 11:
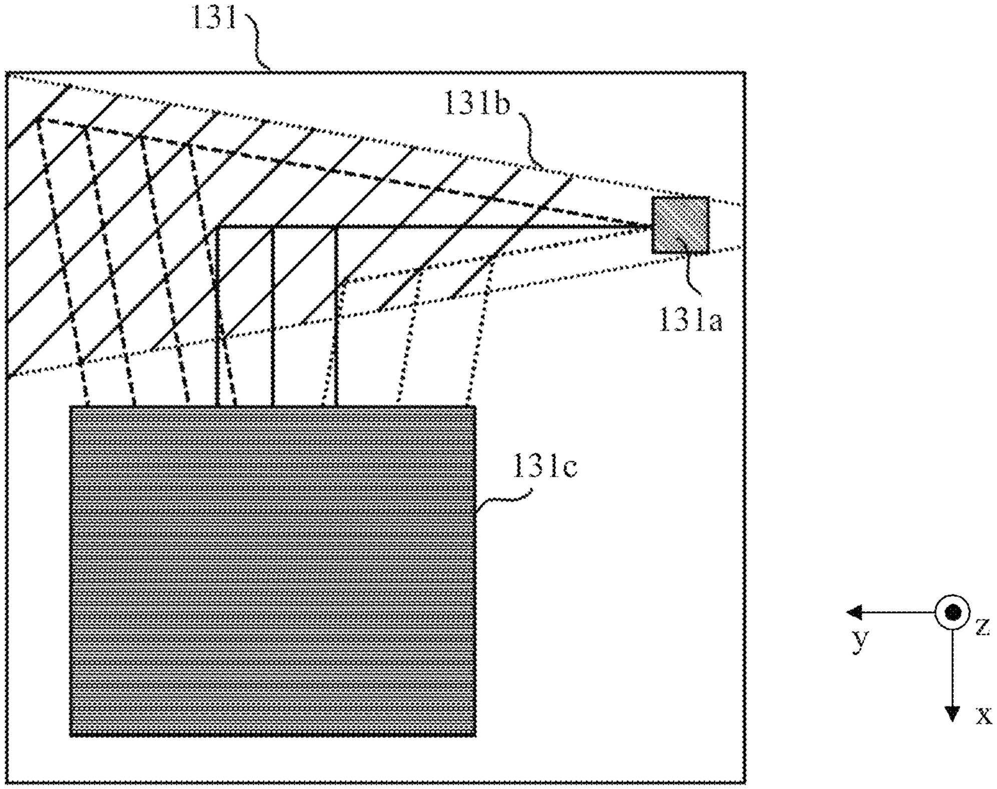
FIG. 11 illustrates the configuration of a light guide plate according to Example 3.
Figure 12:
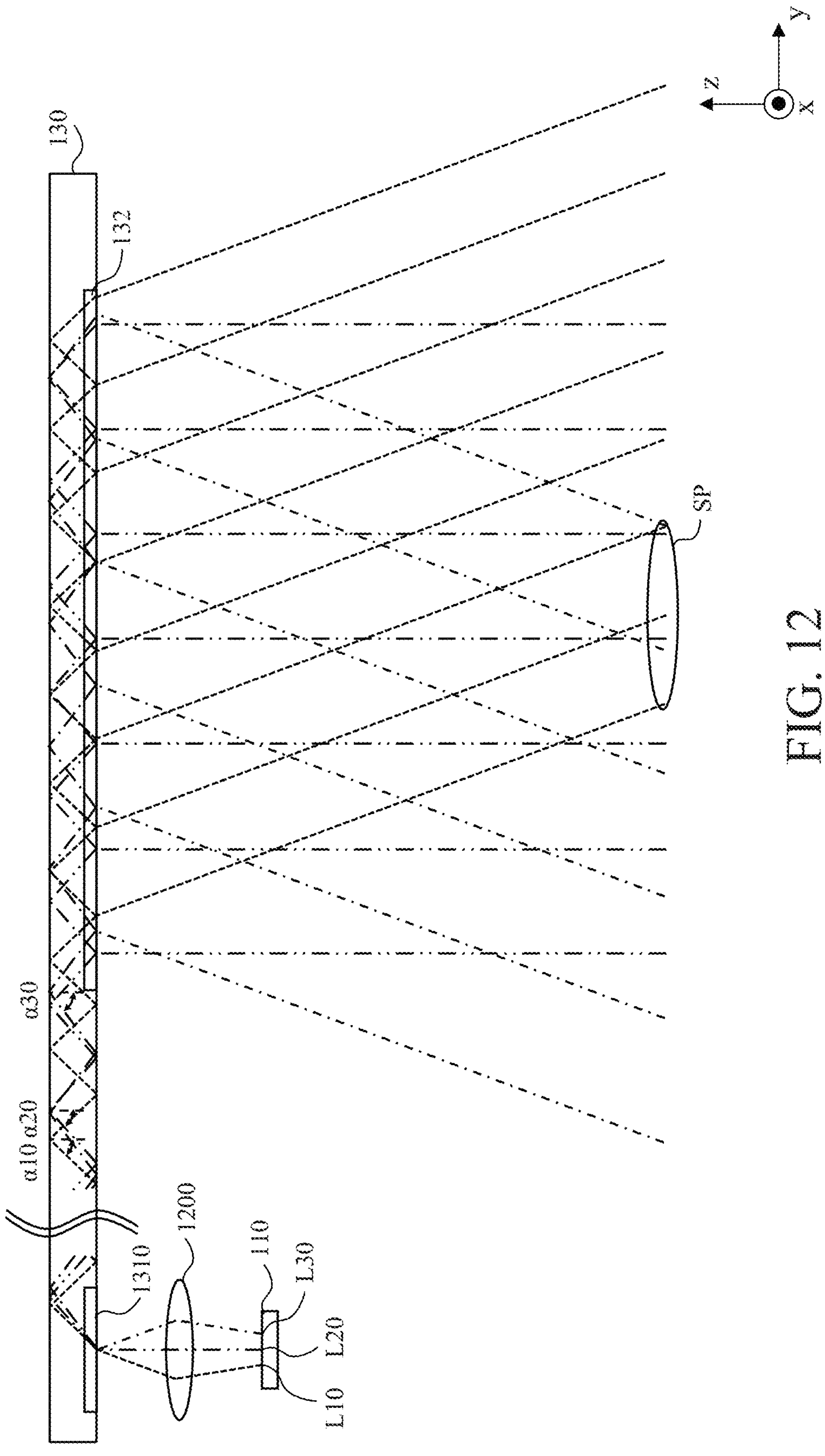
FIG. 12 is a conceptual diagram of a light beam propagating inside a light guide plate in a conventional image display apparatus.

FIG. 11 illustrates a light guide plate 130 according to this example. This is an optical configuration in which a light ray from the light source is two-dimensionally duplicated and emitted to the pupil SP. Reference numeral 131*a* denotes an entrance portion, reference numeral 131*b* denotes a first optical duplication portion, and reference numeral 131*c* denotes a second optical duplication portion. A light beam from the light source enters the entrance portion 131*a* and propagates inside of the light guide plate 131 by total reflection, and is separated into a plurality of light beams in the y direction by the first optical duplication portion 131*b*. The first optical duplication portion 131*b* includes a plurality of half-mirrors that partially reflect the light beam. The light beam duplicated by the first optical duplication portion 131*b* enters the second optical duplication portion 131*c*, is separated into a plurality of light beams in the x direction, and is emitted to the pupil SP. The second optical duplication portion 131*c* corresponds to the plurality of separation surfaces 32*c* in Example 1. The first optical duplication portion 131*b* may include a diffraction element, a metasurface, a holographic element, or the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a light guide plate that can improve the transmittance of external light while reducing light amount unevenness with high light utilization efficiency.

This application claims priority to Japanese Patent Application No. 2023-172715, which was filed on Oct. 4, 2023, and which is hereby incorporated by reference herein in its entirety.

What is claimed is:

1. A light guide plate comprising:

a first surface and a second surface that are parallel to each other; and a first separation surface, a second separation surface, and a third separation surface, each configured to separate incident light into reflected light and transmitting light, and each tilted relative to the first surface, wherein the following inequalities are satisfied:

$$Rs1_{21} > Rs1_{22} > Rs1_{23}$$

$$Rs1_{31} < Rs1_{32}$$

$$Rs1_{33} < Rs1_{32}$$

where $\psi$ is an angle [°] of each separation surface relative to a normal to the first surface, $\theta_n$ ($\theta_1$+5<$\theta_2$<$\theta_3$−5) is an incident angle [°] of an n-th light ray (where n is a natural number) incident on the first surface, and $Rs1_{mn}$ is a reflectance of an m-th separation surface (where m is 1, 2, or 3) for light with a dominant wavelength incident at an incident angle of 90−$\theta_n$+$\psi$ [°].

2. The light guide plate according to claim 1, wherein the following inequality is satisfied:

$$Rs2_{m3} < 0.05$$

where $Rs2m_3$ is a reflectance of the m-th separation surface for the light with the dominant wavelength incident at an incident angle of 90−$\theta_n$−$\psi$ [°].

3. The light guide plate according to claim 1, wherein the following inequality is satisfied:

$$Rs1_{11} > Rs1_{12} > Rs1_{13}.$$

4. The light guide plate according to claim 1, wherein each of the reflectance of the m-th separation surface for the light with the dominant wavelength incident at the incident angle of 90−$\theta_n$+$\psi$ [°] and the reflectance of the m-th separation surface for the light with the dominant wavelength incident at the incident angle of 90−$\theta_n$−$\psi$ [°] is a reflectance of S-polarized light, and wherein the following inequality is satisfied:

$$Rs1_{22} > 2 \times Rp1_{22}$$

where $Rp1_{mn}$ is a reflectance of the m-th separation surface for P-polarized light with the dominant wavelength incident at the incident angle of 90−$\theta_n$+$\psi$ [°].

5. The light guide plate according to claim 1, wherein each of the first to third separation surfaces includes a plurality of dielectric films, and wherein the following inequality is satisfied:

$$90 - \theta_3 - \varphi < \sin^{-1}\sqrt{\frac{n_H^2 n_L^2}{n_G^2(n_H^2 + n_L^2)}} < 90 - \theta_1 - \varphi$$

where $n_H$ is a refractive index of a first film, which has a higher refractive index for the light with the dominant wavelength among films with two largest total thicknesses on the second separation surface, and $n_L$ is a refractive index of a second film, which has a lower refractive index for the light with the dominant wavelength among the films with the two largest total thicknesses on the second separation surface, and $n_G$ is a refractive index for the light with the dominant wavelength of the light guide plate.

6. The light guide plate according to claim 5, wherein the following inequalities are satisfied:

$$M_H > 400$$

$$M_L > 300$$

where $M_H$ [nm] is a total film thickness of the first film, and $M_L$ [nm] is a total film thickness of the second film.

7. The light guide plate according to claim 5, wherein the second separation surface has 20 film layers or more.

8. An image display apparatus comprising:

a light guide plate; and a light source configured to emit a light beam of a predetermined polarization incident on the light guide plate, where the light guide plate includes:

a first surface and a second surface that are parallel to each other; and a first separation surface, a second separation surface, and a third separation surface, each configured to separate incident light into reflected light and transmitting light, and each tilted relative to the first surface, wherein the following inequalities are satisfied:

$$Rs1_{21} > Rs1_{22} > Rs1_{23}$$

$$Rs1_{31} < Rs1_{32}$$

$$Rs1_{33} < Rs1_{32}$$

where $\psi$ is an angle [°] of each separation surface relative to a normal to the first surface, $\theta_n$ ($\theta_1$+5<$\theta_2$<$\theta_3$−5) is an incident angle [°] of an n-th light ray (where n is a natural number) incident on the first surface, and $Rs1_{mn}$ is a reflectance of an m-th separation surface (where m is 1, 2, or 3) for light with a dominant wavelength incident at an incident angle of 90−$\theta_n$+$\psi$ [°].

9. An image display apparatus according to claim 8, wherein the following inequality is satisfied:

$$0.00 < W/R < 0.03$$

where R [nm] is a central wavelength of at least one spectrum of the light beam emitted from the light source, and W [nm] is a half-width of the spectrum.

* * * * *